(12) United States Patent
Archer, III

(10) Patent No.: US 10,669,175 B2
(45) Date of Patent: Jun. 2, 2020

(54) METHOD FOR TREATING SULFIDES IN WASTE STREAMS

(71) Applicant: William Moseley Archer, III, Charlotte, NC (US)

(72) Inventor: William Moseley Archer, III, Charlotte, NC (US)

(73) Assignee: BILL ARCHER, LLC, Charlotte, NC (US)

( * ) Notice: Subject to any disclaimer, the term of this patent is extended or adjusted under 35 U.S.C. 154(b) by 0 days.

(21) Appl. No.: 16/684,832

(22) Filed: Nov. 15, 2019

(65) Prior Publication Data

US 2020/0079666 A1    Mar. 12, 2020

Related U.S. Application Data

(60) Division of application No. 16/437,597, filed on Jun. 11, 2019, which is a continuation-in-part of application No. 16/165,010, filed on Oct. 19, 2018, now Pat. No. 10,315,940, which is a division of application No. 14/854,403, filed on Sep. 15, 2015, now Pat. No. 10,112,853.

(51) Int. Cl.

| | |
|---|---|
| *B01D 53/14* | (2006.01) |
| *C01B 17/05* | (2006.01) |
| *C01B 17/64* | (2006.01) |
| *C01B 17/96* | (2006.01) |
| *C02F 1/72* | (2006.01) |
| *C02F 1/74* | (2006.01) |
| *E21B 21/06* | (2006.01) |
| *C02F 101/10* | (2006.01) |
| *C02F 103/10* | (2006.01) |
| *C02F 103/18* | (2006.01) |
| *C02F 103/36* | (2006.01) |

(52) U.S. Cl.
CPC .......... *C02F 1/725* (2013.01); *B01D 53/1468* (2013.01); *C01B 17/05* (2013.01); *C01B 17/64* (2013.01); *C01B 17/96* (2013.01); *C02F 1/74* (2013.01); *B01D 2251/11* (2013.01); *B01D 2255/65* (2013.01); *B01D 2257/304* (2013.01); *C02F 2101/101* (2013.01); *C02F 2103/10* (2013.01); *C02F 2103/18* (2013.01); *C02F 2103/365* (2013.01); *C02F 2303/02* (2013.01); *C02F 2305/02* (2013.01); *E21B 21/068* (2013.01)

(58) Field of Classification Search
CPC ............ B01D 53/1468; B01D 2251/11; B01D 2255/65; B01D 2257/304; C01B 17/05; C01B 17/64; C01B 17/96; C02F 1/725; C02F 1/74; C02F 2103/10; C02F 2103/18; C02F 2103/365; C02F 2303/02; C02F 2305/02; C02F 2101/101; E21B 21/068
See application file for complete search history.

(56) References Cited

U.S. PATENT DOCUMENTS

| | | |
|---|---|---|
| 2,897,140 A | 7/1959 | Gislon et al. |
| 3,104,951 A | 9/1963 | Urban et al. |
| 3,226,320 A | 12/1965 | Meuly et al. |
| 3,913,673 A | 10/1975 | Barber |
| 4,076,621 A | 2/1978 | Hardison |
| 4,229,747 A | 10/1980 | Hwang |
| 4,615,714 A | 10/1986 | Turk et al. |
| 4,992,078 A | 2/1991 | Meszaros |
| 5,009,869 A | 4/1991 | Weinberg et al. |
| 5,470,356 A | 11/1995 | Meszaros |
| 5,585,051 A | 12/1996 | Hosie et al. |
| 5,922,087 A | 7/1999 | Nishioka et al. |
| 5,948,122 A | 9/1999 | Xu et al. |
| 5,961,670 A | 10/1999 | Cote et al. |
| 8,962,715 B2 | 2/2015 | Engelhardt et al. |
| 8,993,488 B2 | 3/2015 | Matza et al. |
| 10,112,853 B2 | 10/2018 | Archer, III |
| 10,315,940 B2 | 6/2019 | Archer, III |
| 2003/0038078 A1 | 2/2003 | Stamper et al. |
| 2013/0059357 A1 | 3/2013 | Bach et al. |
| 2013/0259743 A1 | 10/2013 | Keasler et al. |
| 2014/0166289 A1 | 6/2014 | Martinez et al. |
| 2014/0374104 A1 | 12/2014 | Seth |
| 2015/0368137 A1 | 12/2015 | Miller et al. |
| 2018/0297845 A1 | 10/2018 | Mengel et al. |
| 2019/0248684 A1 | 8/2019 | Archer, III |

FOREIGN PATENT DOCUMENTS

| | | |
|---|---|---|
| FR | 1105484 A | 12/1955 |
| FR | 1230502 A | 9/1960 |
| GB | 788559 A | 1/1958 |
| GB | 910661 A | 11/1962 |
| GB | 1122889 A | 8/1968 |

OTHER PUBLICATIONS

The Chemistry of Synthetic Dyes ed., K Venkataraman, p. 32, 1974.
Maeda, Yoshimichi, et al.; Treatment of sulfur dye waste waters. V. Oxidation of sodium sulfide by oxygen, Kogyo Yosui, 1967, pp. 60-67, vol. 106, Database: CAPLUS; Abstract Only.
Wolf, Friedrich, et al.; "Oxidation of sulfide ions by oxygen in the presence of sulfur dyes. II," Fortschritte der Wasserchemie und Ihrer Grenzgebiete, 1968, pp. 81-92, No. 10, Databse: CAPLUS; Abstract Only.
The Merck Index, Monograph No. M6107, (2013), via RSC.org.
Search Report for corresponding PCT/US2016/050336, dated Dec. 22, 2016.
Written Opinion for corresponding PCT/US2016/050336, dated Dec. 22, 2016.
Office Action for corresponding U.S. Appl. No. 16/397,123, dated Aug. 2, 2019.
Office Action, U.S. Appl. No. 16/733,436, dated Feb. 26, 2020.
Naito et al., "The Chemical behavior of Low Valence Sulfur Compounds. VII. The Oxidation of Ammonium Sulfide and Ammonium Sulfite with Compressed Oxygen in Aqueous Ammonia Solution." Bull. Chem. Soc. Jap., vol. 44, pp. 2434-2436 (1971).

*Primary Examiner* — Lucas A Stelling
(74) *Attorney, Agent, or Firm* — Tristan A. Fuierer; Olive Law Group, PLLC

(57) ABSTRACT

A method for treating sulfide in an aqueous fluid comprises contacting the fluid with an oxidizer in the presence of a sulfur dye or sulfurized vat dye. In one embodiment, the method comprises treating sulfide contaminated water by contacting the contaminated water with a gas including oxygen in the presence of a sulfur dye or a sulfurized vat dye. The method is useful for remediating industrial, agricultural, and municipal wastewater.

15 Claims, No Drawings

METHOD FOR TREATING SULFIDES IN WASTE STREAMS

CROSS REFERENCE TO RELATED APPLICATIONS

This application is a divisional application claiming priority to U.S. patent application Ser. No. 16/437,597 filed on Jun. 11, 2019, which is a continuation-in-part application claiming priority to U.S. patent application Ser. No. 16/165,010 filed on Oct. 19, 2018, now U.S. Pat. No. 10,315,940, which is a divisional application claiming priority to U.S. patent application Ser. No. 14/854,403 filed on Sep. 15, 2015, now U.S. Pat. No. 10,112,853, all of which are hereby incorporated by reference herein in their entirety. This application is also co-pending with U.S. patent application Ser. No. 16/397,123, filed on Apr. 29, 2019, now allowed, which is a continuation application claiming priority to U.S. patent application Ser. No. 16/165,010.

FIELD OF THE INVENTION

The present invention relates to the treatment of aqueous solutions comprising sulfides. More particularly, the present invention is a process for the treatment of sulfides in an aqueous solution wherein the aqueous solution comprising the sulfides is contacted with a sulfur dye. The present invention is useful for the remediation of sulfides found in natural and industrial aqueous waste streams, wastewater or absorption liquids derived from the absorption of hydrogen sulfide contained in gases. More particularly, the wastewater comprising sulfides can result from industrial operations such as animal waste processing, mining, ore refining, oil drilling, petroleum refining, natural gas processing, and hydraulic fracturing.

BACKGROUND

Current methods of raising commercial livestock include housing a large number of animals within a confined space. Numerous drawbacks of such confinement include, but are not limited to, the significant amount of waste which must be removed periodically to ensure adequate sanitation and to prevent disease and the hydrogen sulfide in the ambient air within the animal enclosure.

The most common commercial waste removal method is to flood the housing area with water to wash away the waste comprising urine and manure. The resulting waste, that being a liquid/solid manure slurry, can be directed to a tank, or more commonly a manmade surface impoundment or lagoon, where the solids and particulates settle to the bottom and the waste decomposes predominantly under anaerobic conditions Anaerobic organisms can degrade many waste constituents without the added expense of mechanical aeration and complete mixing. This type of treatment commonly produces methane gas and sulfides, particularly hydrogen sulfide. Hydrogen sulfide emitting from uncovered anaerobic treatment systems will create foul odors and can also be a safety hazard in confined areas. The methane gas generated could be captured as a fuel if the treatment unit is covered, but the gas is normally still contaminated with hydrogen sulfide which must be reduced to acceptable levels if the methane is to be used for energy generation.

Numerous industrial processes generate hydrogen sulfide which can be captured by absorbers/scrubbers to produce non-volatile compounds such as sodium bisulfide. Crude natural gas and biogas frequently contain hydrogen sulfide as a contaminant which can be removed by absorption. Hydrogen sulfide can also be an ambient air pollutant which can be present in industrial settings and in environments where anaerobic degradation of organic compounds is occurring, such as concentrated animal feeding buildings and pits.

Absorption liquids containing sulfides are generated when a gas containing hydrogen sulfide is processed in an absorber or scrubber where it contacts an aqueous liquid to absorb the hydrogen sulfide. While hydrogen sulfide has some solubility in water, the amount of gas dissolved is limited. Typically, the aqueous liquid will contain an alkali to convert the hydrogen sulfide into a water-soluble bisulfide or sulfide ion to greatly enhance the rate and amount of hydrogen sulfide that is absorbed into the liquid. The base can be added as a single charge or can be added throughout the absorption as alkalinity is consumed by the hydrogen sulfide. In some instances, gases other than hydrogen sulfide may be in the gas stream to be absorbed. If the gas happens to be an alkaline gas, such as ammonia, the amount of base added (if any) to the absorption liquid can be reduced.

One method of eliminating sulfides is to oxidize them to a new compound that is not malodorous or toxic. The oxidation of sulfides in aqueous liquids can be accomplished chemically with oxidizing agents such as hydrogen peroxide, chlorine dioxide, hypochlorite salts, methylmorpholine-N-oxide, nitrate/nitrites. These methods are effective but have drawbacks which can include high chemical costs, handling of hazardous chemicals and formation of unwanted by-products. Oxidation can be accomplished biologically, but this is usually expensive and can produce odors in the treatment units. A third method is oxidation with molecular oxygen in the presence of a catalyst. Sulfides may also be treated by other methods such as absorption or sequestering.

The most common catalyst for sulfide oxidation is a chelated metal catalyst, most particularly iron chelated by an aminopolycarboxylic acid. The normal product of oxidation with this catalyst in aqueous fluids is elemental sulfur which precipitates. The catalyst is typically regenerated with molecular oxygen, normally atmospheric air which can also degrade the catalyst. This method for oxidizing sulfides is not without drawbacks. It requires removal of solid elemental sulfur and replenishment of catalyst.

There is a continued need for a simple and efficient method of removing sulfides from a waste stream, for example, from wastewaters comprising biologically degradable constituents that produce sulfides. There is also a need for a process to reduce the level of hydrogen sulfide in ambient air within animal enclosures without generating a hazardous byproduct.

BRIEF SUMMARY OF THE INVENTION

The present invention provides an inexpensive alternative to the traditional treatment of sulfides by expensive chemicals or by oxygen catalyzed by chelated metal which creates a sulfur precipitate. It has been discovered that sulfur dyes and sulfurized vat dyes will oxidize sulfides dissolved in aqueous fluids when the fluid is contacted with a gas comprising oxygen, for example, atmospheric air. The present invention uses small amounts of inexpensive dye as a means for oxidation of sulfides in the presence of oxygen or other oxidizers. Sulfur dyes and sulfurized vat dyes are stable under the highly alkaline conditions often associated with absorption or scrubbing of hydrogen sulfide from gaseous streams. Sulfide oxidation under alkaline conditions in the presence of sulfur dye is very simple and predominantly produces a non-toxic soluble by-product, thiosulfate. In many applications, the soluble nature of the treatment product will be an advantage.

In one embodiment, the present invention is a method for treating sulfide in an aqueous fluid comprising contacting the fluid with an oxidizer in the presence of at least one sulfur dye or sulfurized vat dye.

In a further embodiment, the present invention is a method for treating sulfides present in wastewater, wherein the sulfides are present in the wastewater as a result of the anaerobic degradation of biologically degradable constituents by bacteria. The method comprises contacting the wastewater comprising the sulfides with an oxidizer in the presence of at least one sulfur dye or sulfurized vat dye.

In a still further embodiment, the present invention is a method for treating sulfide produced by hydrogen sulfide absorption in an alkaline aqueous liquid to form an adsorption liquid comprising dissolved sulfides. The method comprises contacting the absorption liquid with at least one sulfur dye or sulfurized vat dye and concurrently or subsequently contacting the absorption liquid with an oxidizer to provide a treated liquid.

In still a further embodiment, the present invention is a method for collecting and treating hydrogen sulfide present as a pollutant in ambient air, by absorbing (or scrubbing) the hydrogen sulfide out of the ambient air into an aqueous liquid having a pH maintained at about 7 or above in the presence of at least one sulfur dye or a sulfurized vat dye to oxidize the absorbed sulfides using oxygen present in the ambient air. The products of the oxidation are non-hazardous water soluble constituents, predominately thiosulfate.

DETAILED DESCRIPTION OF THE INVENTION

The present invention relates to a method of treating water comprising sulfides, for example, wastewaters comprising biologically degradable constituents which generate sulfides during anaerobic degradation.

As defined herein, the term sulfide includes all forms of inorganic sulfide including hydrogen sulfide, bisulfide ions, sulfide ions and polysulfide ions.

As defined herein, "biologically degradable constituents" includes waste from animals such as humans, dairy cattle, beef cattle, swine, poultry, horses, rabbits, and other concentrated animal raising operations. Animal waste can comprise a mixture of feces and urine as well as wasted feed, bedding and water. Waste characteristics are generally affected by diet, species and the growth stage of the animals, and the waste collection method used, including the amount of water added to dilute the waste. Typically, animal waste is about 80% to about 95% liquid by weight due to urine, sloppy drinking, animal washing and flush water. As such, the animal waste may be pretreated with mechanical systems to remove any unwanted material, larger solids and excess liquids from the animal waste before treatment using the process described herein, wherein the pretreating includes systems comprising at least one of a screw press, a centrifuge, a vibrating screen, mesh screening, a belt filter, a hydrocyclone and other systems that may further reduce particle size and/or remove unwanted large material to ensure easy processing using the method described herein.

The biologically degradable constituents may be treated in an anaerobic treatment unit, which includes holding the biologically degradable constituents in an air-tight tank or a covered surface impoundment. Bacteria will degrade the biologically degradable constituents in these conditions, generating a number of products including, but not limited to, sulfides and methane gas. The methane can be harvested and burned/combusted for energy production. Advantageously, anaerobic treatment does not reduce the nutrients in the biologically degradable constituents, although it may alter the form of the nitrogen (more ammonia) and phosphorus (more orthophosphate). Accordingly, the biologically degradable constituents can be further processed to produce additional products such as fertilizer. Disadvantageously, the sulfides need to be separated from the methane gas to maximize the potential energy of the methane.

The biologically degradable constituents may also be treated in a facultative anaerobic treatment unit in which there are both anaerobic and aerobic treatment zones. This type of treatment occurs typically in open surface impoundments and tanks when there is insufficient mixing and/or oxygen input to result in completely aerobic treatment conditions. Hydrogen sulfide and methane will commonly be produced in the anaerobic zone. While a portion of the sulfide may be oxidized in the aerobic zone, most facultative units will not eliminate all the hydrogen sulfide and will emit a significant portion to the atmosphere.

Selectively treating sulfides as part of the wastewater treatment process using sulfur dyes or sulfurized vat dyes as a catalyst in the presence of oxygen will reduce or eliminate problems posed by elevated sulfide levels. The amount of oxygen needed will be very small compared to that needed for aerobic treatment. The dye-catalyzed oxidation can be employed in both covered and uncovered treatment units, although the benefits will be greater in covered units designed to capture biologically generated methane. Where methane is present, care needs to be taken to avoid an explosive mixture of methane and oxygen.

In one aspect, a method of removing sulfides from wastewater comprises removing the wastewater from an anaerobic or facultative treatment unit to a treatment container, wherein the wastewater comprises sulfides, adding at least one sulfur dye or sulfurized vat dye catalyst to the wastewater to form a mixture, aerating the mixture with a gas comprising oxygen to oxidize the sulfides to yield treated water, and returning the treated water to the anaerobic/facultative treatment unit. The returned treated water will contain both dissolved oxygen and the oxidized form of the catalyst; both of which will provide additional oxidation of sulfides within the surface impoundment. The anaerobic treatment unit includes, but is not limited to, an air-tight tank or a covered surface impoundment. The facultative treatment unit comprises at least one anaerobic zone. The at least one sulfur dye or sulfurized vat dye catalyst can optionally be removed from the treated water by filtration, ultrafiltration, or other means of separation prior to reintroduction of the treated water into the anaerobic or facultative treatment unit Maintaining the mixture at a pH of neutral or above (i.e., pH greater than or equal to 7, preferably in a range from about 7 to about 11) while in the treatment container will provide the added benefit of converting the sulfides to a water soluble product, including thiosulfate, and avoiding the precipitation of elemental sulfur. To maintain the pH at greater than or equal to 7, at least one base can be added, wherein said at least one base can comprise a species selected from the group consisting of sodium hydroxide, potassium hydroxide, ammonia, ammonium hydroxide, calcium hydroxide, magnesium hydroxide, and any combination thereof. The pH can be monitored and adjusted continuously or periodically, as readily understood by the person skilled in the art. The at least one base can be chosen to enhance the downstream fertilizer value of the treated wastewater. The sulfides may be present in the wastewater as a result of the degradation of the biologically degradable constituents by bacteria during anaerobic digestion. With the removal of the sulfides from the wastewater, the other product of the anaerobic digestion, i.e., methane, can be harvested for energy production with a significantly reduced hydrogen sulfide content. The at least one sulfur dye or sulfurized vat dye catalyst separated in this manner can be reused in the sulfide oxidation process.

It should be understood that the gas comprising oxygen can be air, pure oxygen, or a gas comprising oxygen in some percentage between about 10% and about 100%, by volume. In an uncovered unit, the source of oxygen can come solely from the surface transfer of oxygen from the air for treatment.

An oxidation/reduction potential (ORP) meter can be used to determine when the sulfides have been substantially treated prior to reintroduction into the anaerobic or facultative treatment unit. In most matrices, an ORP reading will become less negative as sulfide is oxidized. Depending on the matrix, a reading less negative than about −100 mV usually indicates that the sulfides have been substantially treated.

The anaerobic or facultative treatment container can be a covered container or an uncovered container, as readily determined by the person skilled in the art. The mixture in the treatment container can be agitated, for example by stirring, sonication, aeration, shaking, or any combination thereof.

The method can be operated over a wide range of conditions, including temperature, sulfide concentration, dye concentration, and oxygen input. The rate of sulfide treatment is dependent, at least to some extent, on all four of these parameters. While a higher temperature will generally increase the reaction rate, a higher temperature will also tend to reduce the solubility of oxygen in water. Solubility of oxygen in water is increased by higher pressure. The optimum conditions for best economy depend greatly on the particular circumstances. Since the present invention has utility in a vast range of applications, the optimum conditions will vary widely also. The examples provided demonstrate the robust nature of this method over a wide range of conditions.

The process may be utilized in numerous wastewater treatment applications. Addition of sulfur dye and introduction of oxygen to virtually any sulfide bearing aqueous solution will reduce the sulfide concentrations. Sulfide treatment systems can be set up to operate continuously or as batch processes. The method will have applications in oil field operations to reduce sulfide in waters associated with oil and gas production. In one embodiment, the sulfur dye is retained by filtration, ultrafiltration, or other means of separation to allow the treated water and soluble salts to be reused in the oilfield operation. The method of this invention may also be used in downhole treatment of sulfide bearing waters in oilfields.

In a very simple application, small amounts of sulfur dye added to wastewater impoundments can provide very economical sulfide treatment where oxygen input is accomplished by surface transfer of atmospheric oxygen.

In one embodiment, the method can be incorporated into the absorption process for removing hydrogen sulfide from gaseous streams. Sulfur dye can be added directly to an aqueous absorption liquid having a pH greater than 7, preferably in a range from about 7 to about 11, where an oxidizer, typically comprising or containing oxygen or air, is added to the system. Preferably, the absorption liquid is sufficiently alkaline (having a pH greater than 9) to facilitate the absorption of hydrogen sulfide. Molecular oxygen, typically atmospheric air, can be added at any convenient place in the absorption system provided safety concerns of mixing oxygen with concentrated methane and hydrogen sulfide gases are considered. A treatment unit may be operated at greater than atmospheric pressure to facilitate the dissolving or contacting of the oxygen in the aqueous absorption liquid. Under the alkaline conditions employed to absorb hydrogen sulfide into an aqueous liquid, it is believed that the primary products of the treatment with the sulfur dye are thiosulfates. The form of the thiosulfates depends on which alkali (such as: sodium hydroxide, potassium hydroxide, ammonium hydroxide, calcium hydroxide, or magnesium hydroxide) is used in the absorption liquid. Optionally, filtration, ultrafiltration or other means of separation can be used to separate the soluble products of the sulfide treatment from any insoluble sulfur dye that is retained by the separator. Sulfur dye compounds separated in this manner can be reused in the sulfide oxidation process. Caution is required when a high concentration of flammable hydrogen sulfide and/or other flammable gas are involved to avoid an unsafe condition of an explosive atmosphere. For example, the gas from the anaerobic unit e.g., above the liquid, is directed to an absorption unit, wherein the absorption unit comprises an aqueous absorption liquid comprising the at least one sulfur dye or sulfurized vat dye catalyst, wherein the aqueous absorption liquid has a pH greater than 7, preferably in a range from about 7 to about 11, to form a reaction mixture. A gas comprising oxygen is introduced to the reaction mixture to oxidize the sulfide. Preferably, the aqueous absorption liquid is sufficiently alkaline (having a pH greater than 9) to facilitate the absorption of sulfide therein.

In another embodiment, hydrogen sulfide occurring as a pollutant in ambient air can be collected and treated in a combined process by absorbing the hydrogen sulfide into an aqueous absorption liquid comprising at least one sulfur dye or sulfurized vat dye. The absorption liquid should be maintained at a pH of about 7 or above using any of a number of bases, chosen predominantly for low cost, ease of use and fertilizer value. Bases comprising carbonates, which can produce a gas when acidified, are not recommended because they may interfere with the absorption process. A pH higher than 7 will enhance the absorption of the hydrogen sulfide. In some instances, the ambient air may also contain an alkaline gas, such as ammonia, which will be absorbed in the aqueous absorption liquid and reduce the amount of base required. The presence of oxygen in the ambient air will allow the oxidation of the absorbed sulfide to occur concurrently with the absorption process. The products of the oxidation are non-hazardous water-soluble constituents, predominately thiosulfate. Typically, the absorption fluid will be recycled through the absorption unit numerous times.

The sulfur dyes and sulfurized vat dyes which may be used in accordance with the processes of the invention include those which are either 1) provided in the non-reduced (oxidized) form (where sulfur atoms attached to the dye chromophore are predominantly connected to other chromophore units through disulfide or polysulfide linkages), 2) provided as pre-reduced (Leuco) sulfur dyes (where sulfur atoms exist primarily as thiolate salts), or 3) provided as solubilized sulfur dyes where Bunte salt groups impart water solubility under non-reducing conditions.

Sulfurized vat dyes are chemically and structurally similar to sulfur dyes including having the disulfide/thiolate functionality. They are given the vat dye designation because they are typically dyed using a vat dye process.

Sulfur dyes and sulfurized vat dyes can be dissolved by reducing agents such as sodium sulfide, sodium dithionite or sodium hydrosulfide under alkaline conditions. This reduction breaks the disulfide bonds producing very polar thiolate groups (Dye-S$^-$). This form of the dye is called a Leuco Sulfur Dye. The oxidation/reduction of the sulfur atoms attached to the chromophore structure is reversible as follows:

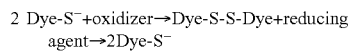

Sulfur dyes can also exist as a non-reduced, water soluble form characterized by thiosulfate groups attached to the chromophores (Dye-S-SO$_3^-$). This form is called a Bunte Salt and is categorized as a Solubilized Sulfur Dye. Solubilized Sulfur Dyes can be prepared by oxidative reaction of a sulfur dye with sulfite. Solubilized Sulfur Dyes will convert to one of the other dye forms when reacted with sulfides. Any of the three forms of sulfur dyes may be used in accordance with this method.

During sulfur dye production and dyeing processes, sulfides can undergo oxidation when Leuco dyes are converted to the insoluble non-reduced (oxidized) form with air. However, this oxidation of sulfides has not been attributed to the presence of the dye. There is no evidence that anyone has recognized that the addition of sulfur dyes or sulfurized vat dyes will act as a catalyst for the treatment of unwanted sulfides in waste waters and other aqueous fluids. It has been discovered that these dyes, even in very low molar concentrations, will treat sulfides in aqueous fluids.

Without being bound by theory, it is believed that the mechanism of the sulfide treatment of the present invention is that the sulfur dye in the non-reduced (oxidized) form reacts with sulfide in solution to oxidize the sulfide to a harmless compound, such as sodium thiosulfate. In reacting the sulfur dye in the sulfide treatment process, the sulfur dye is converted to the Leuco (reduced) form of the dye. When the thus produced Leuco form of the dye is contacted with oxygen or another suitable oxidizer, the Leuco dye is restored to the non-reduced state ready to react with more sulfide. If the absorption liquid is contacted with a Leuco form of the sulfur dye; it is required to simultaneously contact the absorption liquid with an oxidizer such as air to provide the sulfide treatment. While the exact structures and molecular weights of most sulfur dyes are not known, the molecular weight of an individual chromophore unit of Sulfur Black 1 is believed to be about 548 based on a common proposed structure. This molecular weight is about 14 times the weight of a sulfide ion. The method of this invention is demonstrated to be very effective at molar ratios of sulfur dye to sulfide that are less than 1 mole %. More preferably, the molar ratio of sulfur dye to sulfide is effective at less than about 0.6 mole %. This strongly supports that the dye used in this method acts as a catalyst to provide the sulfide treatment.

Sulfur dyes and sulfurized vat dyes which may be utilized in accordance with the method of the invention include but are not limited to the following ("C.I." stands for "Colour Index"):

C.I. Sulfur Yellow 1, 2, 3, 4, 5, 6, 8, 9, 10, 11, 12, 13, 14, 16, 20 and 23, C.I. Leuco Sulfur Yellow 2, 4, 7, 9, 12, 15, 17, 18, 21, 22 and 23 and C.I. Solubilized Sulfur Yellow 2, 4, 5, 19, 20 and 23;

C.I. Sulfur Orange 1, 2, 3, 4, 5, 6, 7 and 8, C.I. Leuco Sulfur Orange 1, 3, 5 and 9 and C.I. Solubilized Sulfur Orange 1, 3, 5, 6, 7 and 8;

C.I. Sulfur Red 1, 2, 3, 4, 5, 6, 7, 8, 9, 10, 12 and 13, C.I. Leuco Sulfur Red 1, 4, 5, 6, 11 and 14 and C.I. Solubilized Sulfur Red 3, 6, 7, 11 and 13;

C.I. Sulfur Violet 1, 2, 3, 4 and 5, C.I. Leuco Sulfur Violet 1 and 3 and C.I. Solubilized Sulfur Violet 1;

C.I. Sulfur Blue 1, 2, 3, 4, 5, 6, 7, 8, 9, 10, 11, 12, 13, 14, 15, 16, 17, 18 and 19, C.I. Leuco Sulfur Blue 1, 2, 3, 5, 7, 8, 9, 11, 13, 15 and 20 and C.I. Solubilized Sulfur Blue 1, 2, 4, 5, 6, 7, 10, 11, 13, and 15;

C.I. Sulfur Green 1, 2, 3, 4, 5, 6, 7, 8:1, 9, 10, 11, 12, 13, 14, 15, 16, 17, 18, 19, 20, 21, 22, 23, 24, 25, 26, 27, 28, 29, 31, 32 and 33, C.I. Leuco Sulfur Green 1, 2, 3, 4, 7, 11, 16 30, 34, 35, 36, and 37 and C.I. Solubilized Sulfur Green 1, 2, 3, 6, 7, 9, 19, 26, and 27;

C.I. Sulfur Brown 1, 2, 3, 4, 5, 6, 7, 8, 9, 10, 11, 12, 13, 14, 14:1, 15, 15:1, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 53:1, 54, 55, 56, 57, 58, 59, 60, 61, 62, 63, 64, 65, 66, 67, 68, 69, 70, 71, 72, 73, 74, 76, 77, 78, 79, 84, 85, 87, 88, 89, 90, 91, 93, and 94; C.I. Leuco Sulfur Brown 1, 3, 4, 5, 8, 10, 11, 12, 14, 15, 21, 23, 26, 31, 37, 43, 44, 81, 82, 86, 87, 90, 91, 92, 93, 94, 95 and 96 and C.I. Solubilized Sulfur Brown 1, 4, 5, 8, 10, 11, 12, 14, 15, 16, 21, 26, 28, 31, 51, 52, 56, 60, 75, 80, and 83;

C.I. Sulfur Black 1, 2, 3, 4, 5, 6, 7, 8, 9, 10, 11, 12, 13, 14, 15, 16 and 17;

C.I. Leuco Sulfur Black 1, 2, 6, 9, 10, 11, and 18;

C.I. Solubilized Sulfur Black 1, 2, 5, 7, and 11; and,

C.I. Vat Yellow 21, C.I. Vat Orange 21, C. I Vat Green 7, C.I. Vat Blue 7, 42, 43, Vat Black 11.

A more complete listing of the sulfur dyes and sulfurized vat dyes mentioned hereinabove may be found in the Colour Index, 3rd. Ed., issued by the Society of Dyers and Colourists (London, GB), as well as in the supplementary volumes published thereto and in the Colour Index International, 4$^{th}$ Edition Online which are hereby incorporated by reference.

At least one sulfur dye or sulfurized vat dye listed hereinabove is used to treat aqueous sulfides in the process of the instant invention. More preferably, at least one of C.I. Sulfur Black 1, C.I. Leuco Sulfur Black 1 and C.I. Solubilized Sulfur Black 1 is utilized in accordance with the process to treat sulfides based on economics and availability.

Compounds other than those listed by Colour Index International may exist or be synthesized which chemically qualify as sulfur dyes or sulfurized vat dyes and may be utilized in accordance with the method of this invention. Such compounds might not possess a sufficiently desirable color or fastness to be offered as a dye, yet perform acceptably in the method of this invention. The terms "sulfur dye" and "sulfurized vat dye" as used in this invention include compounds comprised of monocyclic aromatic, heteroaromatic, or quinoid chromophore units; or polycyclic aromatic, heteroaromatic, or quinoid chromophore wherein said chromophore units are connected by disulfide or polysulfide linkages when in the non-reduced form. Sulfur dyes and sulfurized vat dyes can be converted to the reduced (or Leuco) form by reaction with reducing agents such sodium sulfide, sodium dithionite or sodium hydrosulfide. This reaction cleaves the disulfide linkages of the non-reduced (oxidized) dye to form thiolate functional groups (dye-S$^-$). This conversion between disulfide and thiolate functionality is reversible.

A series of examples was developed and carried out to explore the concept of the method for treating aqueous solutions containing sulfides by contacting the aqueous solution containing the sulfide with a sulfur dye or sulfurized vat dye. It was discovered that the concentration of sulfide in the aqueous sulfide solutions could be reduced by more than 90 percent on the basis of the weight of the sulfide present in the aqueous sulfide solution. More preferably, the concentration of sulfide in the aqueous sulfide solutions could be reduced by more than 95 percent on the basis of the weight of the sulfide present in the aqueous sulfide solution. Most preferably, the concentration of sulfide in the aqueous sulfide solutions could be reduced by more than 96, 97, 98, 99, or 99.5 percent on the basis of the weight of the sulfide present in the aqueous sulfide solution. The process of the present invention was demonstrated over a reaction temperature range of from about 1° C. to about 100° C. More preferably, the process of the present invention can be carried out over a reaction temperature of from about 4° C. to about 80° C. Most preferably, the process of the present invention can be carried out over a reaction temperature of from about 20° C. to about 50° C. The sulfur dye was dissolved in aqueous sulfide solutions in sulfur dye concentrations ranging from about 10 to about 1200 mg/l. These dye concentrations are based on the concentration of commercial dye products which contain less than 100% active dye ingredient. Over the entire range of aqueous sulfide solutions having a concentration of sulfide from about 100 to about 5000 mg/l, it was found that the addition of sulfur dye or sulfurized vat dye resulted in a greater than 96 weight percent reduction of the sulfide in the aqueous sulfide solutions within a treatment time ranging from about 30 to about 120 minutes. When using Sulfur Black 1 as the sulfur dye, the reduction of the sulfide concentration ranged from about 97 to about 99.6 weight percent based on the initial amount of sulfide in the aqueous sulfide solution to be treated, reducing the final concentration of sulfide from as high as about 5000 mg/l to as low as less than about 1 mg/l sulfide in the treated effluent. Table 1 shows a summary of the results of experiments related to the reduction of sulfides in aqueous solutions using sulfur dyes and sulfurized vat dyes compared to a reference case (Zero) wherein no sulfur dye or sulfurized vat dye was added to the aqueous sulfide solution.

TABLE 1

Comparison of Sulfide Treatment with Sulfur Dyes and Sulfurized Vat Dyes

| Ex. No. | Dye | Dye Conc. (mg/l) | Temp (° C.) | Sulfide Initial (mg/l) | Sulfide Final (mg/l) | Treatment Time (Min) | Reduction (%) |
|---|---|---|---|---|---|---|---|
| Zero | None | 0 | 43-46 | 500 | >490 | 120 | <2 |
| 1 | Sulfur Black 1 | 251 | 43-46 | 478 | <1 | 50 | 99.6 |
| 2 | Sulfur Black 1 | 250 | 4-6 | 250 | <5 | 120 | >98 |
| 3 | Sulfur Black 1 | 250 | 78-80 | 250 | <1 | 30 | >99.6 |
| 4 | Sulfur Black 1 | 10 | 42-45 | 100 | 3 | 30 | 97 |
| 5 | Sulfur Black 1 (reused) | 247.5 | 50 | 495 | 6 | 105 | 98.8 |
| 6 | Leuco Sulfur Brown 37 | 1200 | 45-48 | 500 | <20 | 60 | >96 |
| 7 | Leuco Vat Blue 43 | 1200 | 44-45 | 500 | <2.5 | 60 | >99.5 |
| 8 | Sulfur Black 1 | 500 | 40-45 | 5000 | 50 | 75 | 99 |

EXAMPLES

The following examples are intended to demonstrate the wide range of conditions under which sulfur dyes and sulfurized vat dyes are effective in treating sulfide when an oxidizer (in these examples air) is introduced into the aqueous fluid which contains the sulfide.

Example Zero

Control Without Dye

A 1000 mg/l stock sulfide solution (as $S^{-2}$) was made by dissolving 1.503 grams of sodium sulfide nonahydrate in distilled water and diluting it to 250 milliliters. A 100 milliliter sample of 500 mg/l sulfide test solution was made by diluting 50 milliliters of the stock solution to 100 milliliters with distilled water. An aliquot was taken from the sulfide test solution for analysis under buffered pH and ionic strength conditions using a sulfide specific ion electrode calibrated using freshly prepared sulfide standards. (This method of analysis was used for all sulfide analyses in the examples.) The test solution was stirred and heated to 45° C., at which time an air sparge through a diffuser was initiated. The stirred and aerated test solution was maintained at a temperature of 45+/−2° C. Samples were withdrawn for analysis every 30 minutes for 2 hours. A decrease in sulfide concentration of less than 2% relative to the initial sulfide concentration of 500 mg/l was observed after two hours, demonstrating that the sulfide concentration was not markedly affected by the test conditions.

Example 1

C. I Sulfur Black 1

While the initial test of Example Zero was underway, a 1% solution of C.I. Sulfur Black 1 product was prepared by diluting 1 gram of C.I. Sulfur Black 1 to 100 milliliters with distilled water while stirring and heating to 80° C. A 1.8 milliliter portion of the 1% solution was added to the remaining 70 milliliters of test solution from Example Zero to produce a calculated sulfide concentration of 478 mg/l and a Sulfur Black 1 product concentration of 251 mg/l. The test solution was maintained at the same test conditions of temperature, stirring and air sparging as the control in Example Zero. After 30 minutes of sparging, the sulfide concentration in the test sample of Example 1 had decreased to less than 10 mg/l. After 50 minutes the sulfide concentration in the test sample of Example 1 had dropped to less than 2 mg/1; a reduction of approximately 99.6% relative to the initial sulfide concentration of 478 mg/l.

Example 2

C. I. Sulfur Black 1

A test solution containing 250 mg/l sulfide and 250 mg/l of C.I. Sulfur Black 1 product was made by diluting 25 milliliters of the 1000 mg/l sulfide stock solution prepared in Example Zero with 72.5 milliliters of distilled water. The test solution of Example 2 was cooled to 5° C., and then 2.5 milliliters of the 1% Sulfur Black 1 solution prepared in Example 1 was added. The test solution of Example 2 was stirred and sparged with air as in Example 1, while maintaining the test solution of Example 2 at a temperature in the range of 4–6° C. with an ice bath. After 120 minutes a sample of the test solution of Example 2 was collected, and determined to have a sulfide concentration of less than 5 mg/l. This resulted in a reduction of sulfide content by about 98% relative to the initial sulfide concentration of 250 mg/l.

Example 3

C. I. Sulfur Black 1

This test used similar test conditions to Example 2. A test solution containing 250 mg/l sulfide and 250 mg/l of Sulfur Black 1 product was heated to 80° C. at which time air sparging was initiated. After 15 minutes of sparging the sulfide concentration had decreased to approximately 5 mg/l and after 30 minutes, the sulfide concentration had decreased to less than 1 mg/1, a reduction of over 99.6% relative to the initial sulfide concentration of 250 mg/l.

Example 4

This test was performed under similar conditions to Example 1 except that the initial sulfide concentration was 100 mg/l and the sulfur dye product concentration was 10 mg/l. After air sparging for 30 minutes at a temperature of 42-45° C., the sulfide concentration had decreased to less than 3 mg/l. This represents a reduction in the sulfide concentration of about of 97% relative to the initial sulfide concentration of 100 mg/l.

Example 5

C.I. Sulfur Black 1

This example demonstrates that the dye component can be reused. After treating a test solution of 500 mg/l sulfide and 250 mg/l Sulfur Black 1 by air sparging at 50° C. to a final sulfide concentration of less than 1 mg/l, the used mixture was replenished with sulfide and re-treated. A 1.75 milliliter portion of 5% sulfide was added to 175 milliliters of used sulfur dye test mixture producing calculated concentrations of 495 mg/l sulfide and 247.5 mg/l sulfur black product. This replenished mixture was stirred and sparged at 50° C. for 105 minutes resulting in a final sulfide concentration of approximately 6 mg/1, a 98.8% reduction in sulfide concentration relative to the initial sulfide concentration of 495 mg/l.

Example 6

C.I. Leuco Sulfur Brown 37

This test was similar to previous tests except a sulfur dye product containing C.I. Leuco Sulfur Brown 37 was used to treat the sulfide solution instead of C. I. Sulfur Black 1. A solution of C.I. Leuco Sulfur Brown 37 dye was made by diluting 6 grams of DIRESUL Brown RDT-GS liq 150, a liquid dyestuff solution of C.I. Leuco Sulfur Brown 37 dye (Available from Archroma U.S., Inc., Charlotte, N.C.) to 50 milliliters with distilled water. A 500 mg/l sulfide test solution was prepared by diluting 50 milliliters of 1000 mg/l stock sulfide solution to 99 milliliters. This solution was heated to 45° C. and 1 milliliter of the diluted Brown dye was added to produce a solution containing 1200 mg/l of formulated dye product. The solution was stirred and sparged as in previous examples. After 30 minutes the sulfide level had dropped by approximately 90%. After 60 minutes the sulfide concentration was less than 20 mg/1, a greater than 96% reduction in sulfide concentration relative to the initial sulfide concentration of 500 mg/l.

Example 7

C.I. Leuco Vat Blue 43

This test was similar to previous tests except a dye product containing C.I. Leuco Vat Blue 43 was used to treat the sulfide solution. A solution of C.I. Leuco Vat Blue 43 dye was made by diluting 12 grams of DIRESUL Navy RDT-GF 1 liq dyestuff product (Available from Archroma U.S., Inc., Charlotte, N.C.) to 100 milliliters with distilled water. A 500 mg/l sulfide test solution was prepared by diluting 50 milliliters of 1000 mg/l stock sulfide solution to 99 milliliters. This solution was heated to 45° C. and 1 milliliter of diluted Navy dye was added to produce a solution containing 1200 mg/l of formulated dye product. The solution was stirred and aerated as in previous examples. After 30 minutes the sulfide level had dropped by more than 98% to less than 10 mg/l. After 60 minutes the sulfide concentration was less than 2.5 mg/1, a greater than 99.5% reduction in sulfide concentration relative to the initial sulfide concentration of 500 mg/l.

Example 8

C.I. Sulfur Black 1

A test sulfide solution was made by dissolving 3.745 grams of sodium sulfide nonahydrate in distilled water and diluting to a total volume of 99 milliliters. This solution was heated to 45° C. One milliliter of 5% C.I. Sulfur Black 1 solution was then added to produce a test solution of 5000 mg/l sulfide and 500 mg/l Sulfur Black 1. The test solution was stirred and sparged with air while maintaining the test solution temperature in the 40-45° C. range. After 75 minutes a sample was collected and determined to have a sulfide concentration of slightly less than 50 mg/1, a reduction of approximately 99% relative to the initial sulfide concentration of 5000 mg/l.

What is claimed is:

1. A method of selectively oxidizing at least one sulfide in waste water, wherein the sulfide(s) are present in the waste water as a result of degradation of biologically degradable constituents by bacteria during anaerobic treatment, said method comprising:
   removing the wastewater from an anaerobic or facultative treatment unit to a treatment container;
   adding at least one sulfur dye or sulfurized vat dye catalyst to the wastewater to form a mixture;
   aerating the mixture with a gas comprising oxygen to oxidize the sulfide(s) to yield treated water, wherein the treated water has a reduced concentration of sulfide(s) relative to the wastewater; and
   returning the treated water to the anaerobic or facultative treatment unit.

2. The method of claim 1, wherein the at least one sulfide is selected from the group consisting of hydrogen sulfide, bisulfide ions, sulfide ions, polysulfide ions and mixtures thereof.

3. The method of claim 1, wherein said sulfur dye is selected from the group consisting of Sulfur Black 1, Leuco Sulfur Black 1, Solubilized Sulfur Black 1, and mixtures thereof.

4. The method of claim 1, wherein said sulfur dye or sulfurized vat dye is introduced into the wastewater as the Leuco (reduced) form of the dye.

5. The method of claim 1, wherein the at least one sulfide comprises hydrogen sulfide.

6. The method of claim 1, wherein the pH of the mixture is greater than or equal to 7.

7. The method of claim 6, wherein the pH is maintained by adding at least one base selected from the group consisting of sodium hydroxide, potassium hydroxide, ammonia, ammonium hydroxide, calcium hydroxide, magnesium hydroxide, and any combination thereof.

8. The method of claim 6, wherein the sulfide(s) are converted to a water-soluble salt comprising thiosulfate ions.

9. The method of claim 1, wherein the sulfur dye or sulfurized vat dye is separated from the treated water and reused.

10. The method of claim 9, wherein the separation can be effectuated using filtration or ultrafiltration.

11. The method of claim 1, wherein the method operates continuously or as batch processes.

12. The method of claim 1, wherein the biologically degradable constituents comprise waste from animals selected from the group consisting of humans, dairy cattle, beef cattle, swine, poultry, horses, rabbits, and combinations thereof.

13. The method of claim 12, wherein the waste comprises at least one constituent selected from the group consisting of feces, urine, wasted feed, bedding drinking water, animal wash water, flush water, and combinations thereof.

14. The method of claim 13, wherein the waste is pretreated to remove any unwanted material, larger solids and excess liquids before anaerobic digestion, wherein the pretreating comprises at least one of a screw press, a centrifuge, a vibrating screen, mesh screening, a belt filter, and a hydrocyclone.

15. The method of claim 1, wherein there is insufficient mixing and/or oxygen input in the anaerobic or facultative treatment unit to result in completely aerobic treatment conditions.

* * * * *